United States Patent
Wigard et al.

(10) Patent No.: US 11,091,160 B2
(45) Date of Patent: Aug. 17, 2021

(54) V2V LATENCY MEASUREMENT REPORTING TO TRAFFIC SERVER FOR OPTIMIZING THE INTER VEHICLE DISTANCE FOR SELF-DRIVING CARS

(71) Applicant: Nokia Technologies Oy, Espoo (FI)

(72) Inventors: Jeroen Wigard, Klarup (DK); Beatriz Soret, Aalborg (DK); Fernando Tavares, Risskov (DK)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 16/310,761

(22) PCT Filed: Jun. 17, 2016

(86) PCT No.: PCT/US2016/038087
§ 371 (c)(1),
(2) Date: Dec. 17, 2018

(87) PCT Pub. No.: WO2017/218003
PCT Pub. Date: Dec. 21, 2017

(65) Prior Publication Data
US 2019/0184993 A1 Jun. 20, 2019

(51) Int. Cl.
*B60W 30/16* (2020.01)
*G08G 1/16* (2006.01)
(Continued)

(52) U.S. Cl.
CPC ............. *B60W 30/16* (2013.01); *G07C 5/008* (2013.01); *G08G 1/096725* (2013.01);
(Continued)

(58) Field of Classification Search
None
See application file for complete search history.

(56) References Cited

U.S. PATENT DOCUMENTS 8,352,111 B2    1/2013  Mudalige
9,187,095 B2 *  11/2015 Gerdt .................... B60W 30/16
(Continued)

FOREIGN PATENT DOCUMENTS

WO    WO-2012050486 A1    4/2012

OTHER PUBLICATIONS

Fujimoto, N., and M. Nakagawa, "System performance of DS/SS inter-vehicle communication and ranging system under Rician fading channel." Personal, Indoor and Mobile Radio Communications, 1998. The Ninth IEEE International Symposium on. vol. 1. IEEE, 1998.

(Continued)

*Primary Examiner* — Sunit Pandya
(74) *Attorney, Agent, or Firm* — Mintz Levin Cohn Ferris Glovsky and Popeo, P.C.

(57) ABSTRACT

Methods and apparatus, including computer program products, are provided for autonomous vehicles. In one aspect there is provided a method. The method may include detecting, at an autonomous vehicle, at least one vehicle within a certain range of the autonomous vehicle; measuring a latency representative of a time to communicate via a wireless link to the at least one detected vehicle; reporting the measured latency to the network; and receiving, by the autonomous vehicle, information to enable the autonomous vehicle to determine an intervehicle distance for configuration at the autonomous vehicle. Related apparatus, systems, methods, and articles are also described.

19 Claims, 6 Drawing Sheets

(51) Int. Cl.
  *G07C 5/00* (2006.01)
  *H04W 4/46* (2018.01)
  *G08G 1/0967* (2006.01)
  *H04L 12/26* (2006.01)

(52) U.S. Cl.
  CPC ......... *G08G 1/161* (2013.01); *H04L 43/0858* (2013.01); *H04W 4/46* (2018.02); *B60W 2554/801* (2020.02); *B60W 2556/65* (2020.02)

(56) References Cited

U.S. PATENT DOCUMENTS

| | | | |
|---|---|---|---|
| 9,381,919 B2* | 7/2016 | Gerdt | B60W 30/16 |
| 2010/0324775 A1 | 12/2010 | Kermani et al. | |
| 2013/0231829 A1* | 9/2013 | Gerdt | B60W 10/18 |
| | | | 701/41 |
| 2014/0195214 A1* | 7/2014 | Kozloski | H04W 4/70 |
| | | | 703/8 |
| 2017/0234689 A1* | 8/2017 | Gibson | G05D 1/0061 |
| | | | 701/25 |

OTHER PUBLICATIONS

European Communication pursuant to Article 94(3) EPC for Application No. 16734797.0-1203, dated May 25, 2021, (6 pages).

* cited by examiner

- Detect one or more vehicles within a certain range 405
- Message a detected vehicle and wait for a response 410
- Determine latency 415
- Report latency to network 420
- Receive intervehicle distance 425
- Configure intervehicle distance 430

“V2V LATENCY MEASUREMENT REPORTING TO TRAFFIC SERVER FOR OPTIMIZING THE INTER VEHICLE DISTANCE FOR SELF-DRIVING CARS”

CROSS REFERENCE TO RELATED APPLICATIONS

This application is a national-phase entry of Patent Cooperation Treaty Application No. PCT/US2016/038087 filed Jun. 17, 2016, entitled "V2V LATENCY MEASUREMENT REPORTING TO TRAFFIC SERVER FOR OPTIMIZING THE INTER VEHICLE DISTANCE FOR SELF-DRIVING CARS," the contents of which are hereby incorporated by reference in their entirety.

FIELD

The subject matter described herein relates to control of vehicles including autonomous vehicles.

BACKGROUND

Vehicles may include vehicle-based radio systems in order to provide or obtain information, such as traffic information, weather information, and the like. This information may be provided to, or obtained from, other vehicles, roadside sensors, servers, and/or the like. For example, a vehicle may automatically obtain traffic information from roadside sensors, and this information may indicate a possible roadside hazard, such as road ice. The use of this information may facilitate autonomous, driverless vehicles as well as enhance the driver-based vehicle experience.

SUMMARY

Methods and apparatus, including computer program products, are provided for autonomous vehicles.

In some example embodiments, there is provided a method. The method may include detecting, at an autonomous vehicle, at least one vehicle within a certain range of the autonomous vehicle; measuring a latency representative of a time to communicate via a wireless link to the at least one detected vehicle; reporting the measured latency to the network; and receiving, by the autonomous vehicle, information to enable the autonomous vehicle to determine an intervehicle distance for configuration at the autonomous vehicle.

In some variations, one or more of the features disclosed herein including the following features can optionally be included in any feasible combination. The autonomous vehicle may send a message to the at least one detected vehicle. When a response was received from the at least one detected vehicle, the latency associated with a time from when the message was sent to when the response was received by the autonomous vehicle may be measured. The measured latency may be reported to the network, when the response was received from the at least one detected vehicle. The received information may include a value representative of the intervehicle distance for configuration at the autonomous vehicle, the intervehicle distance determined based on the reported measured latency. An indication may be reported that the detected vehicle is likely to be non-autonomous, when the response is not received from the at least one detected vehicle, wherein the intervehicle distance is determined based on the reported indication. The intervehicle distance may represent a minimum and/or an optimum distance between at least two vehicles. The autonomous vehicle may configure operation based on the intervehicle distance.

In another aspect, there may be provided a method that includes receiving, at a server, a latency measurement representative of a time to communicate via a wireless link to at least one detected vehicle, the latency measurement determined by an autonomous vehicle; and sending, by the server, information to enable the autonomous vehicle to enable the autonomous vehicle to configured for operation an intervehicle distance.

In some variations, one or more of the features disclosed herein including the following features can optionally be included in any feasible combination. The intervehicle distance may be determined based on the received latency measurement. The server may determine the intervehicle distance based on whether the at least one detected vehicle is an autonomous type vehicle. The server may determine the intervehicle distance based on road conditions, weather, characteristics of the autonomous vehicle, and/or characteristics of the at least one detected vehicle. The sent information may include a value representative of the intervehicle distance for configuration at the autonomous vehicle, the intervehicle distance determined based on the reported measured latency. The indication may be received that the detected vehicle is likely to be non-autonomous, when the response is not received from the at least one detected vehicle, wherein the intervehicle distance is determined based on the received indication. The server may include a traffic control server.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings.

Like labels are used to refer to same or similar items in the drawings.

DETAILED DESCRIPTION

Vehicle-based communications including vehicle-to-vehicle (V2V) communication, vehicle-to-infrastructure (V2I), vehicle-to-infrastructure-to-vehicle (V2I2V), and/or other vehicle-based communication systems may suffer from latency. This latency may adversely affect the operation of autonomous vehicles. In some example embodiments, there may be provided a latency measurement for vehicle-based communication systems, such as V2V, V2I2V, and V2I communications.

In some example embodiments, processor circuitry, such as a server or computer for example, may determine, based on the latency measurement, an intervehicle distance. The intervehicle distance may be provided to an autonomous vehicle for use as an intervehicle distance between vehicles, and may be established (e.g., configured, set, and/or the like) at the autonomous vehicle, so that the autonomous vehicle may not, as part of normal operation, exceed the established optimum intervehicle distance. For example, the autonomous vehicle may operate so that the distance to the vehicle in front is at, or does not become less than, optimum intervehicle distance. The optimum intervehicle distance may be determined by the network, such as a traffic control server, the autonomous vehicle, and/or other devices.

In some example embodiments, the network/traffic control server may determine the optimum intervehicle distance based on the measured latency reported by an autonomous vehicle and based on other information available to the network/traffic control server. In some example embodiments, the other information used to determine optimum intervehicle distance may include information regarding whether adjacent vehicles are autonomous vehicles or non-autonomous vehicles. Alternatively or additionally, the additional information may include road conditions, traffic/congestion, weather, and/or the like. The intervehicle may be considered optimum in the sense that the intervehicle distance may be determined based on a variety of factors, such as latency and the additional information.

In some example embodiments, the optimum intervehicle distance may be specific to a given autonomous vehicle, although optimum intervehicle distance may be used by a plurality of vehicles covered by a traffic control server configured to provide the intervehicle distance.

As used herein, an autonomous vehicle may refer to a vehicle that can operate, for a given amount of time, autonomously with little or no user or driver input to control the vehicle. The autonomous vehicle may be fully autonomous in the sense that the vehicle can go from point A to point B without any driver input, so the driver essentially serves as a passenger. However, the autonomous vehicle may also be configured to provide a driver-assistance assistance mode in which the driver does exert some control of the vehicle.

In some example embodiments, the latency measurement may be performed directly between vehicles. For example, a first vehicle (which is in direct V2V communications with a second vehicle) may send a command over a communication link to the second vehicle. The first vehicle may measure the time it takes for a response to be returned. Alternatively or additionally, the latency measurement may be performed through a network node, such as an access point or base station. When this is the case, an end-to-end latency measurement may be determined based on the latencies from the first vehicle to the second vehicle and back via the network. In the case of measuring latency through a portion of the network, the measured latency may include a time it takes to send a packet from the autonomous vehicle to the network via the uplink plus the a time it takes to send the packet from the network to the receiving vehicle in the downlink.

Although some of the examples refer to latency between vehicles, the latency may also be determined between a vehicle and other objects as well, such as a person in a vehicle carrying a smartphone for example.

Once latency is determined, the latency may be used to determine an optimum driving distance between vehicles, which may represent a safe intervehicle distance. The determined latency may be made available to for example a traffic control server. The traffic control server may receive the latency measurement from a given autonomous vehicle and determine an optimum intervehicle distance, and then distribute, via the network, the intervehicle distance to one or more vehicles covered by traffic control server. The traffic control server may also include additional information such as whether the vehicles within a given range of a given autonomous vehicle are also autonomous. Alternatively or additionally, the additional information may include average speed at a given location, weather conditions, traffic conditions, traffic hazards, accidents, speed limits, current average speed, and the like. The additional information may also be taken into account by the traffic control server when establishing the optimum intervehicle distance. For example, if the vehicles in front of and/or behind a given autonomous vehicle are also autonomous, the traffic control server may determine a shorter intervehicle distance for that given autonomous vehicle, when compared to the case when there is a non-autonomous, human control vehicle in the vicinity (e.g., in front of or behind) the given autonomous vehicle. Similarly, road conditions such as weather may cause the traffic control server to configure a longer intervehicle distance, while congestion may weigh the traffic control server to seek a shorter intervehicle distance.

In some example embodiments, the traffic control server may configure a plurality of vehicles with one or more intervehicle distances, which may serve as the optimum intervehicle distance with respect to safety, efficiency, and/or the like. In this way, traffic congestion may be alleviated (by for example enabling more vehicles to operate safely on a given roadway), while providing a certain margin of safety. The optimum intervehicle distance may thus represent a threshold distance, such as a minimum intervehicle distance, that at any given instant of time is configured at the autonomous vehicle, so that the autonomous vehicle should maintain that threshold intervehicle distance during normal operation to allow for example safe braking, mitigate accidents, enhance traffic flow, and/or the like.

In some example embodiments, the intervehicle distance may be specific to a given car. For example, a driver may be disabled/impaired or have a vehicle that requires a longer stopping distance due to a fault or the vehicle itself. Likewise, a truck may require a longer stopping distance, or a vehicle carrying a dangerous substance may require a longer intervehicle distance. In these examples, the traffic control server may be provided with this additional information regarding the vehicle state and/or driver state (which may be reported by the autonomous vehicle or other device to the traffic control server, for example). As such, the traffic control server may determine, in this example, a longer intervehicle distance based on the specific vehicle's state and/or driver state.

To illustrate further, autonomous vehicles may include on-board sensors to regulate speed, change lanes, avoid collisions with other cars, avoid road hazards, stay in lane, and/or the like. Moreover, these autonomous vehicles may include vehicle-based communication systems to enable communications with other vehicles, the network, and/or other objects to provide or obtain information related to traffic, road conditions, vehicle state, share emergency information, and/or other related information. To obtain or provide information, the vehicle-based communication system at an autonomous vehicle may establish at least one wireless link directly to other vehicles (e.g., via V2V communications), establish at least one wireless link via the network/infrastructure to other vehicles (e.g., via V2I2V communications), and/or establish a link with another device or the network infrastructure to obtain the information (e.g., via vehicle to infrastructure (V2I) communications). Keeping a safe, optimum distance between vehicles is a parameter of interest to a vehicle and, in particular, autonomous vehicles. For example, in the case of cars driven by humans, a general rule of thumb is that a driver should, under normal conditions, maintain a minimum distance to the vehicle in front, and this minimum distance is equivalent to the distance travelled by a vehicle in two seconds. This so-called two-second rule may alleviate accidents caused by sudden braking by the vehicle in front. The two-second rule takes into account, among other things, a typical human reaction time needed to brake a car.

Figure 1A:
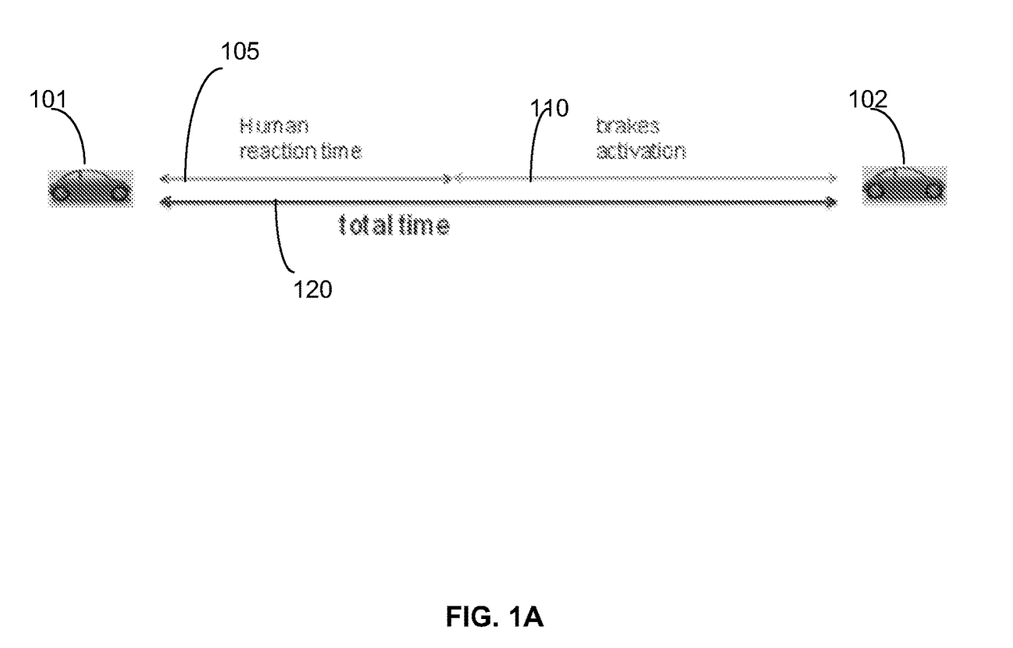
FIG. 1A depict a timeline showing total time associated with a human-initiated vehicle stop, in accordance with some example embodiments.

FIG. 1A depicts an example of a delay budget 120 for a human-driven car. The total time required to for vehicle 101 to brake includes a human reaction time 105 and the brake activation time (or distance) until the vehicle comes to a complete stop, which may vary from car to car depending on type or quality of the vehicle's brakes, weather conditions, vehicle or driver impairment, and/or the like. With respect to human reaction time 105, it may not be constant but depend on one or more factors, such as driver impairment, such as fatigue, quantity of tasks being performed by the driver, a physical or medical condition or disability, and/or the like. However, with the advent of autonomous driving, the delay budget 120 for braking may be reduced.

Figure 1B:
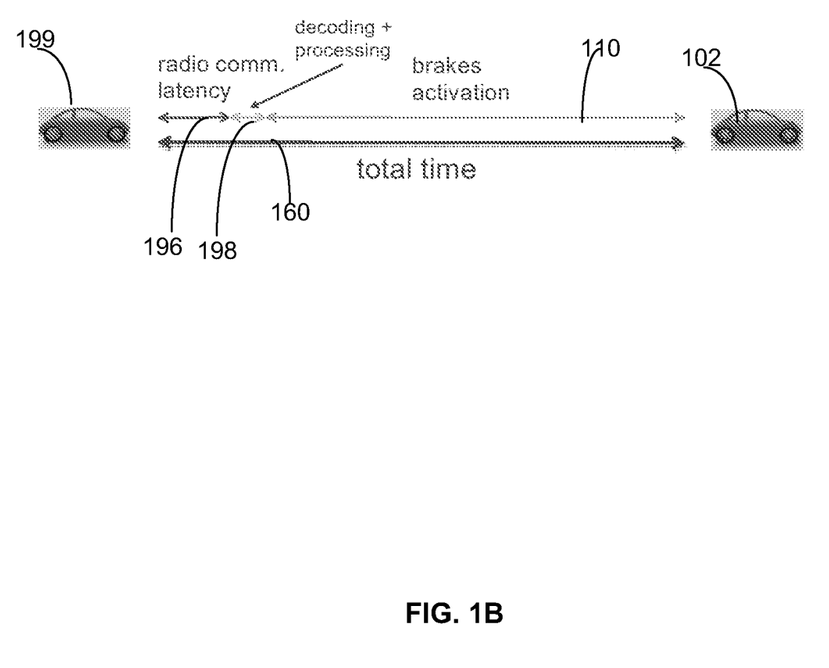
FIG. 1B depict a timeline showing total time associated with a machine-based autonomous driving vehicle stop, in accordance with some example embodiments.

FIG. 1B depicts an example of a delay budget 160 for an autonomously driven car 199. The total time 160 required to brake includes latency which may include radio communications latency 196 and/or device latency 198 associated with the devices (e.g., decoding, coding, and/or other processing related delays), and the brake activation time 110.

For the autonomously driven vehicle 199 to have a shorter total time 160 than the human driven car's total time 120, the latency 196/198 may be configured to be less than a human's reaction time 105. To illustrate further, the first vehicle 199 may include a sensor measuring the distance to the second vehicle 102, so in this example the latency 196/198 may include the RF latency for the sensor, such as a radar and/or the like, to emit a signal and receive a response and process that response (as well as the device related delays at each vehicle to process the messages). For example, when latency is determined between vehicles, the delay associated with sending for example a brake warning command from vehicle 102 to 199 may be known, and, as such, taken into account when establishing an intervehicle stopping distance for vehicle 199.

Figure 2:
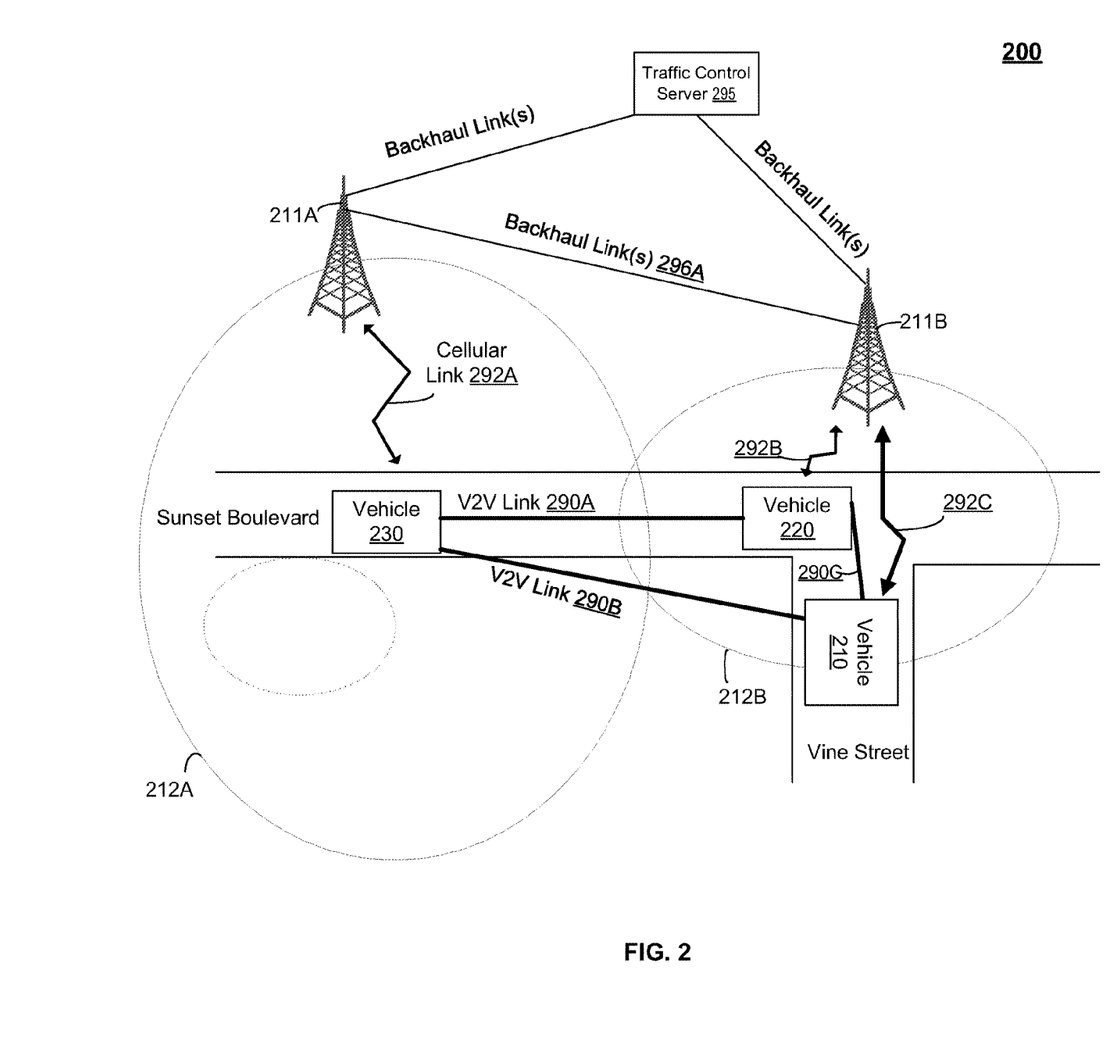
FIG. 2 depicts an example of a system for latency measurement reporting, in accordance with some example embodiments.

FIG. 2 depicts an example system 200 including one or more vehicles 210, 220, and 230, each of which may include vehicle-based radios, in accordance with some example embodiments.

Although FIG. 2 depicts specific quantities of devices, vehicles, and/or the like, other quantities and configurations may be used as well. Moreover, although FIG. 2 depicts all of the vehicles as being autonomous vehicles, some of the vehicles may be non-autonomous (driven by a human).

The system 200 may include a traffic control server 295. The traffic control server 295 may receive a latency measurement made by for example vehicle 230 and reported to the traffic control server. The traffic control server may, in response to the receipt of the latency measurement, establish, for a given vehicle such as vehicle 230 for example, an intervehicle distance and the send that intervehicle distance to the vehicle 230. The traffic control server may include additional information to enable establishing the intervehicle distance for vehicle 230. For example, the traffic control server may have an indication regarding whether other vehicles such as vehicles 220 and 210 are autonomous. Alternatively or additionally, the traffic control server may have additional information regarding weather information, road conditions, and/or other information that may be used to set the intervehicle distance. To illustrate further, the traffic control server 295 may have information indicating whether other vehicles, such as vehicles 210 and 220, in the vicinity of vehicle 230 are autonomous vehicles, and this information may also be used to set the intervehicle distance. For example, the traffic control server may reduce, for vehicle 230, the optimum intervehicle distance if vehicles 210 and/or 220 are autonomous, but increase, for vehicle 230, the optimum intervehicle distance if vehicles 210 and/or 220 are non-autonomous and thus under human-driver control.

The traffic control server 295 may be distributed and/or centralized. For example, a plurality of traffic control server may be distributed along a roadside, and each traffic control server may serve a corresponding region by providing at least intervehicle distance values. Alternatively or additionally, the traffic control server 295 may be centralized covering a larger region.

In some example embodiments, the vehicles 210-230 may include, as noted, vehicle-based radios. Moreover, the vehicles 210-230 may include sensors and/or other processing circuitry to measure and/or enable a latency determination latency. Furthermore, the vehicles 210-230 may include driving control circuitry coupled to the processing circuitry to configure, at the vehicle, an optimum driving distance between cars. At each of the vehicles, the vehicle-based radios may provide at least vehicle-to-vehicle (V2V) communications between (or among) the vehicles. When vehicles 210, 220, and 230 are autonomous vehicles, each vehicle may be equipped with vehicle-based radio to enable communications (e.g., V2V, V2I, V2I2V, and/or other communications). For example, vehicle-based radios may be used to establish links (for example, Bluetooth, Bluetooth Low-Energy, near field communications (NFC), WiFi, laser links, infrared links, and/or any other radio technology) in order to exchange messages and other information, such as traffic conditions, weather, car location information, warnings (for example, that another vehicle is too close or poses a hazard), autonomous driving-related information, and/or any other information, although longer range cellular links may be used as well. Moreover, vehicle-based radios may, in many instances, exchange information automatically over links/communication infrastructure, without involving the vehicle's driver. Moreover, vehicle radios may communicate with other sensors, relays, access points, networks, and/or devices as well, including roadside sensors (for example, traffic lights), roadside relays that extend or repeat the transmissions of other vehicles, and/or the like.

The vehicle-based radios may establish point-to-point V2V links directly between the vehicles, although the communications may be via other devices and/or networks as well including relays, access points, base stations, and/or the public land mobile network. Furthermore, the vehicle-based radios may also be used to establish communications to the network including the traffic control server 295, in which case the communications may be referred to as vehicle-to-infrastructure communications (V2I). For example, vehicle 230 may directly establish a V2V link 290A to exchange information with vehicle 220 and/or 210. And, the vehicle-based radios may also be used to establish communications to other vehicles via the network, in which case the communications may be referred to as vehicle-to-infrastructure-to vehicle communications (V2I2V). For example, vehicle 230 may communicate with vehicle 220 via a cellular link 292A, a base station 210A (which serves area 212A including vehicle 230), a backhaul 296A, a cellular link 292B, and base station 210B (which serves area 212B including vehicle 220). Moreover, the vehicle-based radios may establish communications with other devices or objects, such as sensors, internet of things devices, intelligent traffic lights, roadside sensors, road ice sensors, and/or the like. In some example embodiments, the so-called "end-to-end" (E2E) latency associated with the sending a message via the network from vehicle 230 to vehicle 220 (for example via the cellular link 292A, base station 210A backhaul 296A, cellular link 292B, and base station 210B) may also be determined and reported to the traffic control server.

The vehicles 210-230 may comprise any type of land-based vehicle, such as a car, a motorcycle, and/or the like. Although communications among vehicle radios may be via direct point-to-point links, the communications may also be via, or be under the control of, another node or network, such as a wireless access point/base station and/or public land mobile network.

Figure 3:
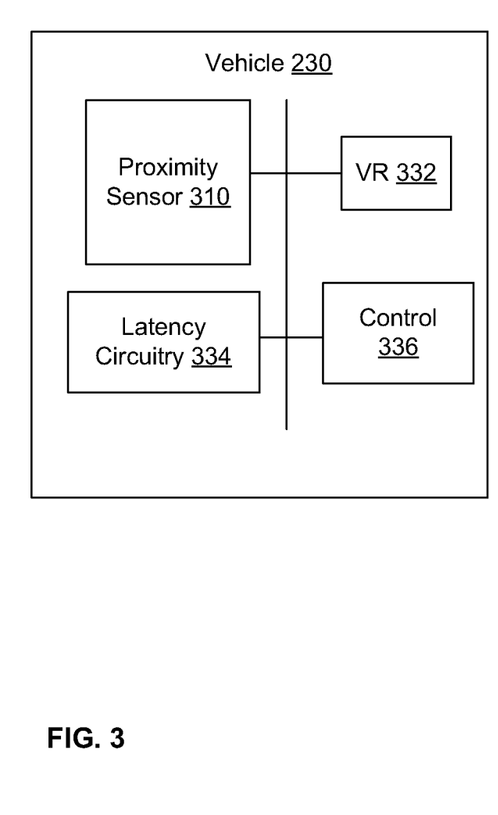
FIG. 3 depicts an example of an autonomous vehicle, in accordance with some example embodiments.

System 200 may also include wireless access points such as base stations 211A-B to enable access to the network or infrastructure. The base stations 211A-B may be configured as an evolved Node B (eNB) base station serving macrocells 212A and 212B (also referred to herein as cells and coverage areas). Moreover, when base stations 210A and 210B are implemented as an eNB type base station, as noted above, the base stations may be configured in accordance with standards, such as for example 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations 211A-B may also be configured to provide other types of air interfaces, such as various first generation (1G) communication protocols, second generation (2G or 2.5G) communication protocols, third-generation (3G) communication protocols, fourth-generation (4G) communication protocols, fifth-generation (5G) communication protocols, and/or any other wireless access network communication protocols. Although certain standards and technologies are described, these are merely examples as other standards and technologies may be used as well. Moreover, the base stations may also be configured as a local access point, such as a WiFi access point and/or other radio technology, serving a small cell including a given vehicle. to serve the vehicles FIG. 3 depicts an example implementation of a vehicle, such as vehicle 230 including a vehicle-based radio (VR) 332. Vehicles 210 and 220, if configured as an autonomous vehicle, may include the same or similar configuration.

The vehicles 210-230 may include a proximity sensor 310 to detect the presence of other vehicles or objects within the vicinity of a given vehicle. For example, vehicle 230 may include a radar, a sonar, a LIDAR, a camera, an RF beacon, and/or other type of optical or RF sensor to detect whether other cars are within a certain distance from vehicle 230. To illustrate further, vehicle 230's proximity sensor may detect that vehicles 220 and 210 are the vicinity of vehicle 230 as it drives along Sunset Boulevard.

The vehicles 210-230 may include latency circuitry 334 to determine latency. For example, a vehicle may determine latency to each of the detected vehicles. To illustrate further, vehicle 230 may establish links 290A and 290B with detected vehicles 220 and 230. Latency circuitry 334 may then send a command via link 290A to vehicle 220. Latency circuitry 334 may then wait for a response from vehicle 220. The time for the response to the command may be set as a latency between vehicle 230 and 220. In some example embodiments, if a vehicle does not respond to the command sent by vehicle 230, the latency circuitry may treat the non-responsive vehicle as a non-autonomous vehicle and report that information to the traffic control server, for example. Latency circuitry 334 may also send a command via link 290B to vehicle 210. Latency circuitry 334 may then wait for a response from vehicle 210, and the response time may be set as a latency between vehicle 230 and 210. Latency circuitry 334 may report the latencies to the traffic control server 295 via vehicle-based radio 332.

Alternatively or additionally, latency circuitry 334 may determine end-to-end latency. For example, vehicle 230 may send the command to vehicle 220 via cellular link 292, backhaul link 296A, and cellular link 292B. Latency circuitry 334 may then wait for a response from vehicle 220. The time for the response to the command may be indicative of the end-to-end latency via the network between vehicles 230 and 220. This end-to-end latency may also be reported to the traffic control server 295.

Alternatively or additionally, the latency circuitry 334 may report to the traffic control server 295 other information about the vehicle, such as vehicle 230. For example, additional information about the vehicle's state, driver's state, and/or any other information (e.g., weather, road conditions, hazards, information regarding other detected vehicles including whether the others are autonomous, etc.) that may be used by the traffic control server 295 to set the intervehicle distance.

The vehicles 210-230 may include driving control circuitry 336. Driving control circuitry may receive from the traffic control server 295 the intervehicle distance and then configure that intervehicle distance at the vehicle for use in establishing for example a minimum safe driving distance between vehicles. For example, vehicle 230 may report the latency to vehicle 230, and receive in response the intervehicle distance between vehicles 230 and 220. If vehicle 220 fails to respond to the command sent by vehicle 230, vehicle 230 may, as noted, indicate to the network including traffic control server 295 that vehicle 220 is likely non-autonomous, in which case driving control server 295 may provide a longer intervehicle distance (which may be a default), when compared to the case when vehicle 220 is autonomous.

Figure 4:
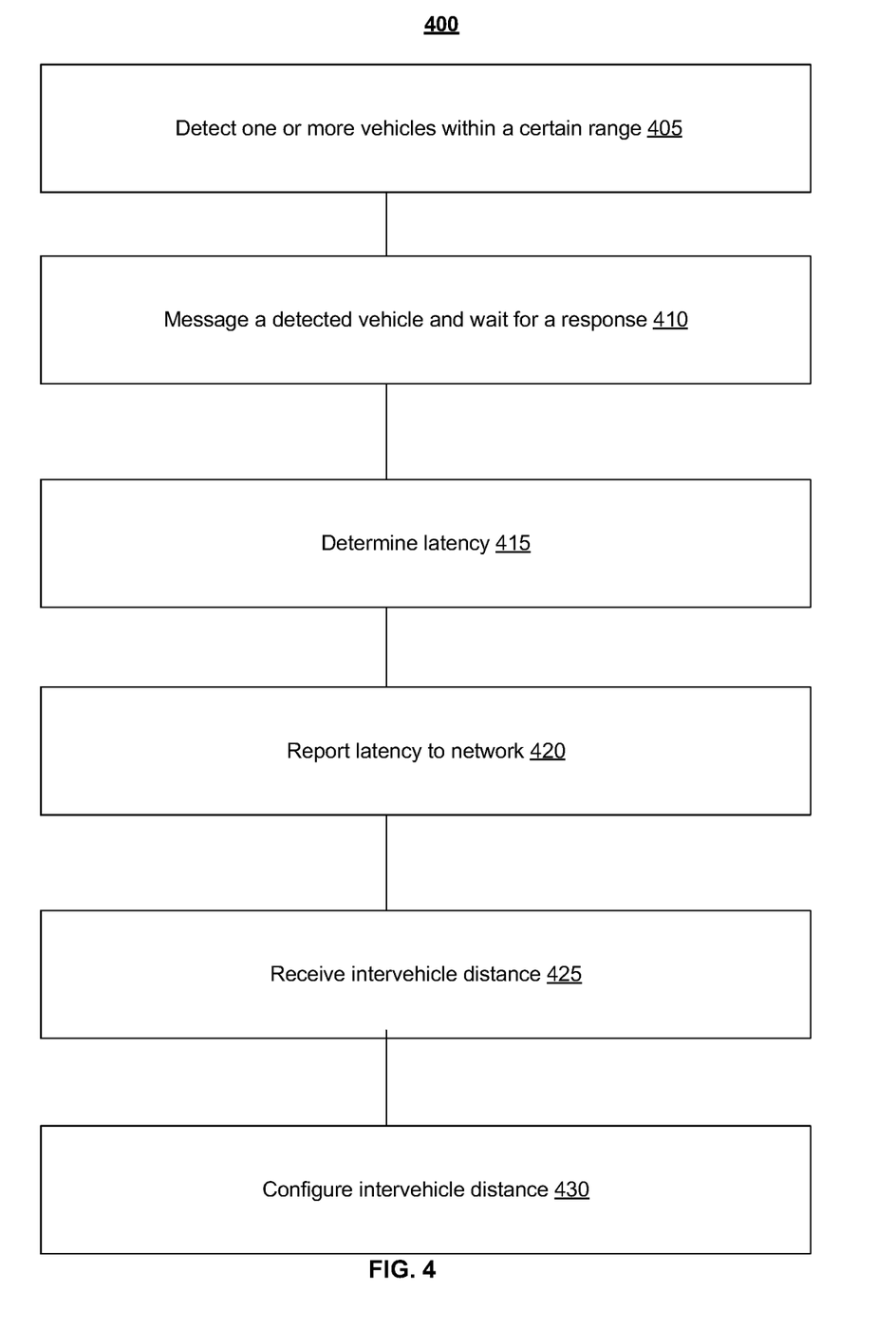
FIG. 4 depicts an example of a process for latency measurement reporting, in accordance with some example embodiments.

FIG. 4 depicts an example of a process 400 for configuring one or more autonomous vehicles with an intervehicle distance, in accordance with some example embodiments. The description of FIG. 4 also refers to FIGS. 2 and 3.

Process 400 may enable the traffic control server to obtain the actual latency associated with V2V, V2I2V, and other autonomous vehicle communications. For example, the traffic control server may determine, based on reported latency, an intervehicle distance, and may provide the intervehicle distance to an autonomous vehicle, so that the autonomous vehicle can drive based on the intervehicle distance. In some example embodiments, the intervehicle distance may be determined based on additional information (which may be available at the traffic control server). This additional information may include reported information regarding whether adjacent vehicles are autonomous or non-autonomous. In this way, the network including the traffic control server may control the intervehicle distance of an autonomous car in a system that includes autonomous and non-autonomous vehicles.

In some example embodiments, the intervehicle distance is determined based on a latency measured from direct V2V communications between vehicles, while in some example embodiments, the intervehicle distance is determined based on a latency measured that communication via the network as in V2I2V.

At 405, one or more vehicles within a certain range may be detected, in accordance with some example embodiments. For example, the autonomous vehicle 230 (which may include proximity sensor 310) may from time to time or continuously monitor and detect, in a certain region, other objects including autonomous and/or non-autonomous vehicles (as well as other objects including people). In the example of FIG. 2, autonomous vehicle 230 including proximity sensor 310 may detect that vehicles 210 and 220 are nearby. As noted, the proximity sensor 310 may include a radar, a sonar, a LIDAR, a camera, an RF beacon, and/or other type of optical or RF sensor to detect whether other objects including vehicles are within a certain distance from vehicle 230.

In response to a detection at 405, a message may be sent, at 410, to a detected vehicle and a corresponding response message may be received, in accordance with some example embodiments. For example, the vehicle 230 may send a message to the detected vehicles such as vehicle 220 via V2V link 290A, and wait for a response to that message. Similarly, vehicle 230 may send a message to the other detected vehicles such as vehicle 210 via V2V link 290B, and wait for a response to that message.

If vehicle 220 and/or 210 are not autonomous vehicles (e.g., a human driven vehicle without vehicle-based radios supporting V2V, V2I, and/or V2V2I communications), vehicle 230 may not receive a response and note that vehicle 220 and/or 210 are not autonomous vehicles (and report the finding to the traffic control server 295). In this way, the latency detection does not require the vehicles to be autonomous vehicles as the traffic control server may set a default intervehicle distance when a non-autonomous vehicle is present. In some example embodiments, vehicle 230 may set a timer, so if a responsive message is not received before the timer elapses, vehicle 230 considers the non-responsive vehicle as a non-autonomous vehicle and reports the finding to the traffic control server 295.

In some example embodiments, the message may be a predetermined message type that triggers a response by the receiver. For example, the vehicle 230 may send a ping message to vehicle 220, which may trigger vehicle 220 to promptly respond. In some example embodiments, the message may be a predetermined message type that triggers a response by the receiver. For example, vehicle 230 may send a predetermined message type to vehicle 220, which may trigger vehicle 290 to promptly respond. In the previous examples, the latency (or delay) for the message to be sent and a response to be returned includes the RF latency 196 and processing latency 198.

Although the previous example refers to a ping message and a predetermined message type, the message sent at 410 may be of another type. For example, the message may be a Cooperative Awareness Message (CAM) configured to trigger a response by the receiving vehicle to the sender of the CAM message. For example, a CAM message (see, e.g., ETSI TS 102 637-2) may be extended so when it is sent by vehicle 230 to vehicle 220, it may trigger vehicle 220 to promptly respond.

At 415, latency may be determined, in accordance with some example embodiments. For example, the latency may be determined by vehicle 230 based on the amount of time (or delay) it takes for a message to be sent to vehicle 220 and a response from vehicle 220 to be returned to vehicle 230. In this example, the latency includes the RF latency 196 and processing latency 198. Although the previous example describes a so-called direct latency measurement between vehicles, the latency measurement may also include one or more network nodes, such as base stations or access points 211A/211B. For example, if the vehicle 230 sends, at 410, a message to vehicle 220 via base station 211A and/or 211B and a response to that message is received by the vehicle 230, the latency would be the total time between the message being sent and a response being received.

At 420, the determined latency may be reported to the network, in accordance with some example embodiments. For example, the vehicle 230 may send a message to the traffic control center 295 via a V2I link 292A and base station 211A. As noted, the reporting may also include an indication of vehicles that are non-autonomous (or at least thought to be so due to lack of V2V link response).

In some example embodiments, each autonomous vehicle including a vehicle-based radio (e.g., V2V, and the like) may perform 405-420 to provide latency information to the traffic control server 295 and/or receive (at 425) an intervehicle distance from the traffic control server 295. To determine intervehicle distance, the traffic control server 295 may take into account additional information, such as whether the other vehicles in the vicinity of the reporting vehicle are human driven and/or autonomous. Because the vehicles report to the traffic control server vehicles detected that are not autonomous vehicles having V2V communications, the traffic control server 295 may be able to determine intervehicle distance based on whether the detected vehicle is autonomous or non-autonomous. For example, the traffic control server 295 may determine a shorter intervehicle distance if all of the detected vehicles around vehicle 230 are autonomous, but determine a longer intervehicle distance if some of the detected vehicles around vehicle 230 are non-autonomous.

In some example embodiments, when latency to a given vehicle cannot be measured (for example, a non-autonomous, man-driven vehicle or vehicle not replying to the message sent via V2V communications at 410), the determined intervehicle distance may be set to a default value, which may be larger when compared to the autonomous vehicle case. To determine intervehicle distance, the traffic control server 295 may also take into account additional information, such as weather, road conditions, roadside hazards, vehicle state or type, driver state of condition, congestion, and/or any other information that may affect determining an optimum or minimum intervehicle distance. For example, traffic control server 295 may include or have access to information (e.g., knowledge) regarding the vehicles, such as vehicle capabilities, state of the different vehicle components (e.g., brake condition, tire condition, etc.), and/or the like which may be used to establish a minimum vehicle-to-vehicle distance to the other cars. The traffic control server may set a single vehicle-to-vehicle distance for all cars in a predefined area or it may provide a minimum vehicle-to-vehicle distance for every pair of cars (or between categories of cars) to be used until overwritten by for example the traffic control server.

In some example embodiments, the traffic control server 295 may determine an intervehicle distance for a given region. In some example embodiments, the traffic control server 295 may determine an intervehicle distance on a per vehicle basis, so each vehicle reporting latency to the traffic control server 295 may receive its intervehicle distance.

At 425, the intervehicle distance may be received, in accordance with some example embodiments. For example, traffic control server 295 may send to a vehicle such as vehicle 230 via V2I link 292A an intervehicle distance, although other links may be used (including V2V links, for example). In response to receiving intervehicle distance, a vehicle such as vehicle 230 may then configure, at 430, the received intervehicle distance for operation of the autonomous vehicle.

In some example embodiments, process 400 may enable vehicles capable of V2V communication to obtain knowledge of the latencies to and/or from other vehicles capable of V2V communication in a given region (e.g., within a detection range at 405). Regarding non-autonomous vehicles (or those not responding at 410 via V2V links), the non-autonomous vehicles may, as noted, be detected and reported to the traffic control center In some example embodiments, the autonomous vehicle may operate using a first intervehicle distance when the vehicle in front is an autonomous vehicle (as detected and measured via process 400, and may operate using a second, longer first intervehicle distance when the vehicle in front is not an autonomous vehicle (assuming of course similar weather conditions and other factors). Although the process 400 describes the traffic control server determining the intervehicle distance, the vehicle itself may convert the latency to an intervehicle distance. However, when this is the case, the network including the traffic control server may facilitate the intervehicle distance determination. For example, the network may provide some parameters representing for instance the vehicle class. To illustrate further, the information provided by the network to determine the intervehicle distance may be different depending on the vehicle class (for example, a truck may be configured to have additional intervehicle distance, when compared to a smaller, automobile.

In some example embodiments, a sensor, such as a radar, camera, LIDAR, and/or the like, may perform the detecting, at the autonomous vehicle, of at least one vehicle to determine whether it is within range. Moreover, that sensor may provide a distance measurement, which can be converted to a time, such as the latency representative of a time to communication via a wireless link to at least one detected vehicle.

In some example embodiments, the traffic control server 295 (see, e.g., FIG. 2) may receive the latency measurement representative of a time to communicate via a wireless link to at least one detected vehicle, the latency measurement determined by an autonomous vehicle. The traffic control server may send information to enable the autonomous vehicle to determine an intervehicle distance for configuration at the autonomous vehicle. The information may include the intervehicle distance itself and/or assistance information to allow the autonomous vehicle to determine an intervehicle distance. The intervehicle distance may be determined based on the received latency measurement. The server may determine the intervehicle distance based on whether the at least one detected vehicle is an autonomous type vehicle. The server may determine the intervehicle distance based on road conditions, weather, characteristics of the autonomous vehicle, and/or characteristics of the at least one detected vehicle. The sent information may include a value representative of the intervehicle distance for configuration at the autonomous vehicle, the intervehicle distance determined based on the reported measured latency. The indication may be received that the detected vehicle is likely to be non-autonomous, when the response is not received from the at least one detected vehicle, wherein the intervehicle distance is determined based on the received indication. The server may include a traffic control server.

Figure 5:
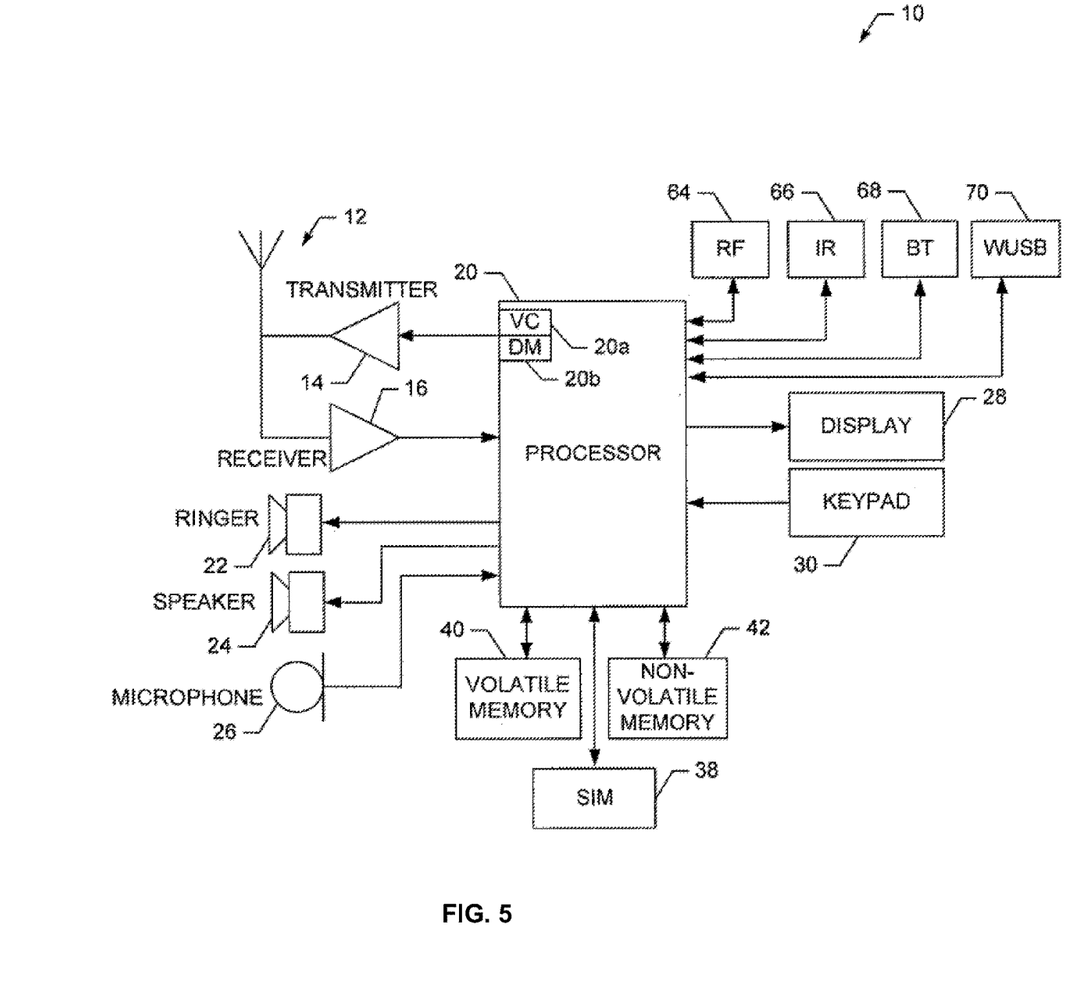
FIG. 5 depicts an example of a radio, in accordance with some example embodiments.

FIG. 5 illustrates a block diagram of an apparatus 10, which can be configured as vehicle-based radio for use with V2V, V2I, V2I2V, and/or other communications as well, in accordance with some example embodiments. Moreover, the apparatus 10 may also be used to provide at least a portion of the base stations.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 5, apparatus 10 may also include one or more mechanisms for sharing and/or obtaining data. Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory, and/or the like. Like volatile memory 40, non-volatile memory 42 may include a cache area for temporary storage of data. At least part of the volatile and/or non-volatile memory may be embedded in processor 20. The memories may store one or more software programs (for example, an application and/or user interface associated with personal communications via local vehicle-to-vehicle links), instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example the functions disclosed at process 200. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to provide process 200, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry. A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause methods as disclosed herein (see, for example, process 400 and/or the like).

Without in any way limiting the scope, interpretation, or application of the claims appearing below, a technical effect of one or more of the example embodiments disclosed herein is network determination, based on actual latency measurements, of intervehicle distance between vehicles in a system including non-autonomous and autonomous vehicles.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method, comprising:
   detecting, at an autonomous vehicle, at least one vehicle within a certain range of the autonomous vehicle;
   measuring a latency representative of a time for the at least one detected vehicle to respond to a message sent by the autonomous vehicle via a wireless link;
   reporting, to a network, the measured latency; and
   receiving, at the autonomous vehicle, information from the network, the information including an intervehicle distance for configuration at the autonomous vehicle, the intervehicle distance being determined at the network, and the intervehicle distance being determined based at least on the measured latency reported to the network.

2. The method of claim 1, wherein the measuring of the latency includes sending, by the autonomous vehicle, the message to the at least one detected vehicle, and wherein the latency is determined based at least on a first time when the autonomous vehicle sent the message and a second time when the autonomous vehicle receives, from the at least one detected vehicle, a response to the message.

3. The method of claim 2, further comprising:
   in response to the at least one detected vehicle failing to respond to the message within a threshold quantity of time, reporting, to the network, an indication that the at least one detected vehicle is non-autonomous, wherein the intervehicle distance being determined further based on the reported indication.

4. The method of claim 1, wherein the information includes a value representative of the intervehicle distance for configuration at the autonomous vehicle.

5. The method of claim 1, further comprising:
   configuring, by the autonomous vehicle, operation based on the intervehicle distance.

6. The method of claim 1, wherein the intervehicle distance represents a minimum and/or an optimum distance between the autonomous vehicle and the at least one vehicle.

7. An apparatus, comprising:
   at least one processor; and
   at least one memory including computer program code, the at least one memory and the computer program code configured to, with the at least one processor, cause the apparatus to perform at least the following:
   detect, at the apparatus, at least one vehicle within a certain range of the apparatus;
   measure a latency representative of a time for the at least one detected vehicle to respond to a message sent by the apparatus via a wireless link;
   report, to a network, the measured latency; and
   receive, at the apparatus, information from the network, the information including an intervehicle distance for configuration at the apparatus, the intervehicle distance being determined at the network, and the intervehicle distance being determined based at least on the measured latency reported to the network.

8. The apparatus of claim 7, wherein the apparatus measures the latency by at least sending, to the at least one detected vehicle, the message.

9. The apparatus of claim 8, wherein the latency is determined based at least on a first time when the apparatus sent the message and a second time when the apparatus receives, from the at least one detected vehicle, a response to the message.

10. The apparatus of claim 9, wherein the apparatus is further configured to at least:
    in response to the at least one detected vehicle failing to respond to the message within a threshold quantity of time, report, to the network, an indication that the at least one detected vehicle is non-autonomous, the intervehicle distance being determined further based on the reported indication.

11. The apparatus of claim 8, wherein the apparatus reports, to the network, the measured latency in response to receiving the response from the at least one detected vehicle.

12. The apparatus of claim 7, wherein the received information includes a value representative of the intervehicle distance for configuration at the apparatus.

13. The apparatus of claim 7, wherein the apparatus is further configured to at least configure, based on the intervehicle distance, an operation of the apparatus.

14. The apparatus of claim 7, wherein the intervehicle distance represents a minimum and/or an optimum distance between the apparatus and the at least one detected vehicle.

15. An apparatus, comprising:
    at least one processor; and at least one memory including computer program code, the at least one memory and the computer program code configured to, with the at least one processor, cause the apparatus to perform at least the following:

receive, at the apparatus, a latency measurement representative of a time for at least one vehicle to respond to a message sent by an autonomous vehicle, via a wireless link, the at least one vehicle detected at the autonomous vehicle to be within a certain range of the autonomous vehicle, the latency measurement being determined by the autonomous vehicle;

determine, based at least on the received latency measurement, an intervehicle distance; and send, to the autonomous vehicle, information including the intervehicle distance for configuration at the autonomous vehicle.

16. The apparatus of claim 15, wherein the intervehicle distance is determined further based on an indication that the at least one detected vehicle is non-autonomous.

17. The apparatus of claim 16, wherein the apparatus is further configured to a least receive, from the autonomous vehicle, the indication that the at least one detected vehicle is non-autonomous, and wherein the autonomous vehicle sends the indication in response to the at least one detected vehicle failing to respond to a message from the autonomous vehicle within a threshold quantity of time.

18. The apparatus of claim 15, wherein the intervehicle distance is determined further based on a road condition, a weather condition, a characteristic of the autonomous vehicle, and/or a characteristic of the at least one detected vehicle.

19. The apparatus of claim 15, wherein the information includes a value representative of the intervehicle distance for configuration at the autonomous vehicle.

* * * * *